US008312021B2

(12) United States Patent
Matveeva et al.

(10) Patent No.: US 8,312,021 B2
(45) Date of Patent: Nov. 13, 2012

(54) GENERALIZED LATENT SEMANTIC ANALYSIS

(75) Inventors: Irina Matveeva, Chicago, IL (US); Ayman Farahart, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 877 days.

(21) Appl. No.: 11/228,924

(22) Filed: Sep. 16, 2005

(65) Prior Publication Data

US 2007/0067281 A1    Mar. 22, 2007

(51) Int. Cl.
G06F 7/00    (2006.01)
(52) U.S. Cl. ..................................... 707/739
(58) Field of Classification Search .............. 707/1–5, 707/739, 999.001–999.005
See application file for complete search history.

(56) References Cited

U.S. PATENT DOCUMENTS

| | | | |
|---|---|---|---|
| 5,675,819 A * | 10/1997 | Schuetze | 704/10 |
| 6,477,524 B1 * | 11/2002 | Taskiran et al. | 1/1 |
| 6,775,677 B1 * | 8/2004 | Ando et al. | 707/739 |
| 6,778,995 B1 * | 8/2004 | Gallivan | 1/1 |
| 6,847,966 B1 * | 1/2005 | Sommer et al. | 1/1 |
| 7,440,947 B2 * | 10/2008 | Adcock et al. | 1/1 |
| 2002/0103799 A1 * | 8/2002 | Bradford et al. | 707/6 |
| 2002/0194158 A1 * | 12/2002 | Stensmo | 707/2 |
| 2003/0159106 A1 * | 8/2003 | Aono et al. | 715/500 |
| 2003/0225749 A1 * | 12/2003 | Cox et al. | 707/3 |
| 2004/0093557 A1 * | 5/2004 | Kawatani | 715/500 |
| 2004/0098385 A1 * | 5/2004 | Mayfield et al. | 707/3 |
| 2004/0128080 A1 * | 7/2004 | Tolley | 702/20 |
| 2004/0158569 A1 * | 8/2004 | Evans et al. | 707/100 |
| 2005/0049867 A1 * | 3/2005 | Deane | 704/245 |
| 2005/0149494 A1 * | 7/2005 | Lindh et al. | 707/3 |
| 2006/0253427 A1 * | 11/2006 | Wu et al. | 707/3 |
| 2006/0259481 A1 * | 11/2006 | Handley | 707/5 |

OTHER PUBLICATIONS

Bellegarda, J.R., "Exploiting latent semantic information in statistical language modeling," Proceedings of the IEEE, vol. 88, No. 8, pp. 1279-1296, Aug. 2000 URL: http://ieeexplore.ieee.org/stamp/stamp.jsp?arnumber=880084&isnumber=19040.*
Landauer et al. "An Introduction to Latent Semantic Analysis". Discourse Processes, 25, 259-284. 1998.*
G. Salton and M. J. McGill, "Introduction to Information Retrieval," McGraw-Hill, New York, 1983.*
"Detecting Patterns in the LSI Term-Term Matrix" (2002) by April Kontostathis, William M. Pottenger, Ph. D in Proceedings ICDM'02 Workshop on Foundations of Data Mining and Discovery.*

(Continued)

*Primary Examiner* — Robert Timblin
(74) *Attorney, Agent, or Firm* — Shun Yao; Park, Vaughan, Fleming & Dowler LLP

(57) ABSTRACT

One embodiment of the present invention provides a system that builds an association tensor (such as a matrix) to facilitate document and word-level processing operations. During operation, the system uses terms from a collection of documents to build an association tensor, which contains values representing pair-wise similarities between terms in the collection of documents. During this process, if a given value in the association tensor is calculated based on an insufficient number of samples, the system determines a corresponding value from a reference document collection, and then substitutes the corresponding value for the given value in the association tensor. After the association tensor is obtained, a dimensionality reduction method is applied to compute a low-dimensional vector space representation for the vocabulary terms. Document vectors are computed as linear combinations of term vectors.

12 Claims, 3 Drawing Sheets

OTHER PUBLICATIONS

Deerwester, S., Dumais, S. T., Furnas, G. W., Landauer, T. K. and Harshman, R. (1990), Indexing by latent semantic analysis. Journal of the American Society for Information Science, 41: 391-407. doi: 10.1002/(SICI)1097-4571(199009)41:6<391::AID-ASI1>3.0.CO;2-9.*

David Hull, Improving text retrieval for the routing problem using latent semantic indexing, Proceedings of the 17th annual international ACM SIGIR conference on Research and development in information retrieval, p. 282-291, Jul. 3-6, 1994, Dublin, Ireland.*

G. W. Furnas, S. Deerwester, S. T. Dumais, T. K. Landauer, R. A. Harshman, L. A. Streeter, K. E. Lochbaum, Information retrieval using a singular value decomposition model of latent semantic structure, Proceedings of the 11th annual international ACM SIGIR conference on Research and development in information retrieval, p. 465-480, May 1988, G.*

Nello Cristianini, John Shawe-Taylor and Huma Lodhi Latent Semantic Kernels Journal of Intelligent Information Systems vol. 18, Nos. 2-3, 127-152, Mar. 1, 2002.*

Landauer, T.K., and Dumais, S.T. (1997). A solution to Plato's problem: The latent semantic analysis theory of the acquisition, induction, and representation of knowledge. Psychological Review, 104(2):211-240.*

J.E. Tenanaum et al., "A Global Geometric Framework for Nonlinear Dimensionality Reduction," *Science*, vol. 290, 2319-2323, 2000.

T. Hofmann, Probabilistic Latent Semantic Analysis, Proceedings of the Fifteenth Conferernce on Uncertainty in Artificial Intelligence, Morgan Kaufman Publishers, San Francisco, California, pp. 289-296.

"Laplacian Eigenmaps for Dimensionality Reduction and Data Representation," *Neural Computation*, Jun. 2003, 15(6): 1373-1396.

S.T. Roweis et al., "Nonlinear Dimensionality Reduction by Locally Linear Embedding," *Science*, vol. 290, pp. 232-2326, 2000.

S. T. Dumais et al., "Using Latent Semantic Analysis to Improve Information Retrieval," Proceedings of CHI '88: *Conference on Human Factors in Computing*, New York: ACM, 281-285.

* cited by examiner

GENERALIZED LATENT SEMANTIC ANALYSIS

GOVERNMENT LICENSE RIGHTS

This invention was made with United States Government support under Contract No. MDA904-03-C-0404 awarded by ARDA. The United States Government has certain rights in the invention.

BACKGROUND

1. Field of the Invention

The present invention relates to techniques for comparing textual information. More specifically, the present invention relates to a method and an apparatus for representing the semantic content of textual information within a document to facilitate document comparison operations.

2. Related Art

A wide range of computer-based applications involve comparison of textual data. For example, applications that perform information retrieval, information filtering and text classification in documents typically involve a large number of comparisons of textual data. In existing systems, a vector-space representation of the documents is typically computed and then the inner-product or cosine between the document vectors is used as a measure of similarity between the documents. The input data for such systems typically consists of a static document collection which can be used to compute a vector-space representation of the documents. It is also desirable for such systems to include a method for computing a representation for out-of-collection documents, such as user queries for information retrieval operations.

Finding a meaningful vector-space representation for textual data is a difficult problem. One of the most widely used approaches is to represent documents as vectors in a multidimensional space in which each dimension corresponds to one vocabulary term (see G. Salton and M. J. McGill, "Introduction to Information Retrieval," McGraw-Hill, New York, 1983). The measure of similarity between two documents used under this representation is based on matching terms that occur in the documents.

Unfortunately, this representation has drawbacks. It loses all word order information by treating documents as "bags of words." More importantly, this representation treats all terms as orthogonal dimensions and thus disregards any semantic connections between terms within a document. Consequently, this representation cannot be used to deal with language phenomena such as ambiguity, synonymy and polysemy directly.

Hence, what is needed is a method and an apparatus for representing textual data to facilitate comparison operations without the above-described problems.

SUMMARY

One embodiment of the present invention provides a system that builds an association tensor (such as a matrix) to facilitate document and word-level processing operations. During operation, the system uses terms from a collection of documents to build an association tensor, which contains values representing pair-wise similarities between terms in the collection of documents. During this process, if a given value in the association tensor is calculated based on an insufficient number of samples, the system determines a corresponding value from a reference document collection, and then substitutes the corresponding value for the given value in the association tensor. (Note that the term "insufficient number of samples" can refer to zero or more samples.)

In a variation on this embodiment, building the association tensor involves using statistical association measures or corpus-derived measures of association to represent similarities between terms.

In a variation on this embodiment, building the association tensor involves computing confidence values for each value in the association tensor. Furthermore, it involves retaining values in the association tensor if corresponding confidence values are greater than a pre-determined threshold.

In a variation on this embodiment, the system also performs a dimensionality-reduction operation on the association tensor. Performing this dimensionality-reduction operation can involve using any one of a number of different methods, such as the isometric mapping (ISOMAP) method, the local linear embedding (LLE) method, the Laplacian Eigenmaps embedding method, multidimensional scaling techniques, and singular-value decomposition techniques.

In a variation on this embodiment, after the association tensor is computed, the system uses the association tensor to compute a vector-space representation for documents and/or queries. This involves first computing a vector-space representation for individual terms in the documents and/or queries, and then computing a weighted linear combination of the vectors for the individual terms to form vectors which represent the documents and/or queries.

In a further variation, the system can use the computed vectors for the documents and/or queries to perform: a clustering operation; an information-retrieval operation; a text-segmentation operation; a text-translation operation; a cognitive-modeling operation; a synonym-detection operation; or a related-term-identification operation.

In a variation on this embodiment, the reference document collection is the World Wide Web (or a proprietary document collection). In this variation, the process of determining the corresponding value from the reference document collection involves using a search engine to query the World Wide Web (or the proprietary document collection) to determine the corresponding value.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs).

Association Matrix

Figure 1:
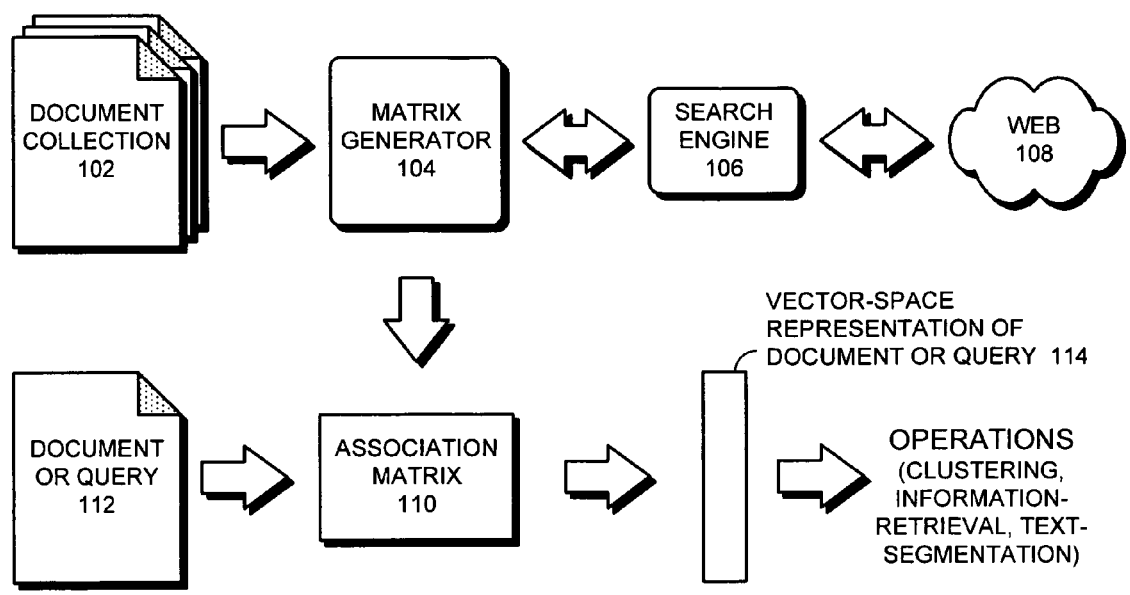
FIG. 1 illustrates how an association matrix is generated and used in accordance with an embodiment of the present invention.

FIG. 1 illustrates how an association matrix is generated and used for document-comparison purposes in accordance with an embodiment of the present invention. As is illustrated in FIG. 1, document collection 102, which contains textual information, is fed into matrix generator 104, which generates an association matrix 110. If values in association matrix 110 are calculated based on an insufficient number of samples, then matrix generator 104 recalculates these values through a "back-off" process, which uses a search engine 106 to gather corresponding statistics from the web 108. In this way, the web 108 can serve as a backup "reference" document collection.

After association matrix 110 is generated, a document or query 112 can be processed by using association matrix 110 to generate a vector-space representation 114 of the document or query. This vector-space representation 114 can then be used to perform various operations that involve comparisons between documents, such as clustering, information retrieval and text-segmentation.

Creating an Association Matrix

Figure 2:
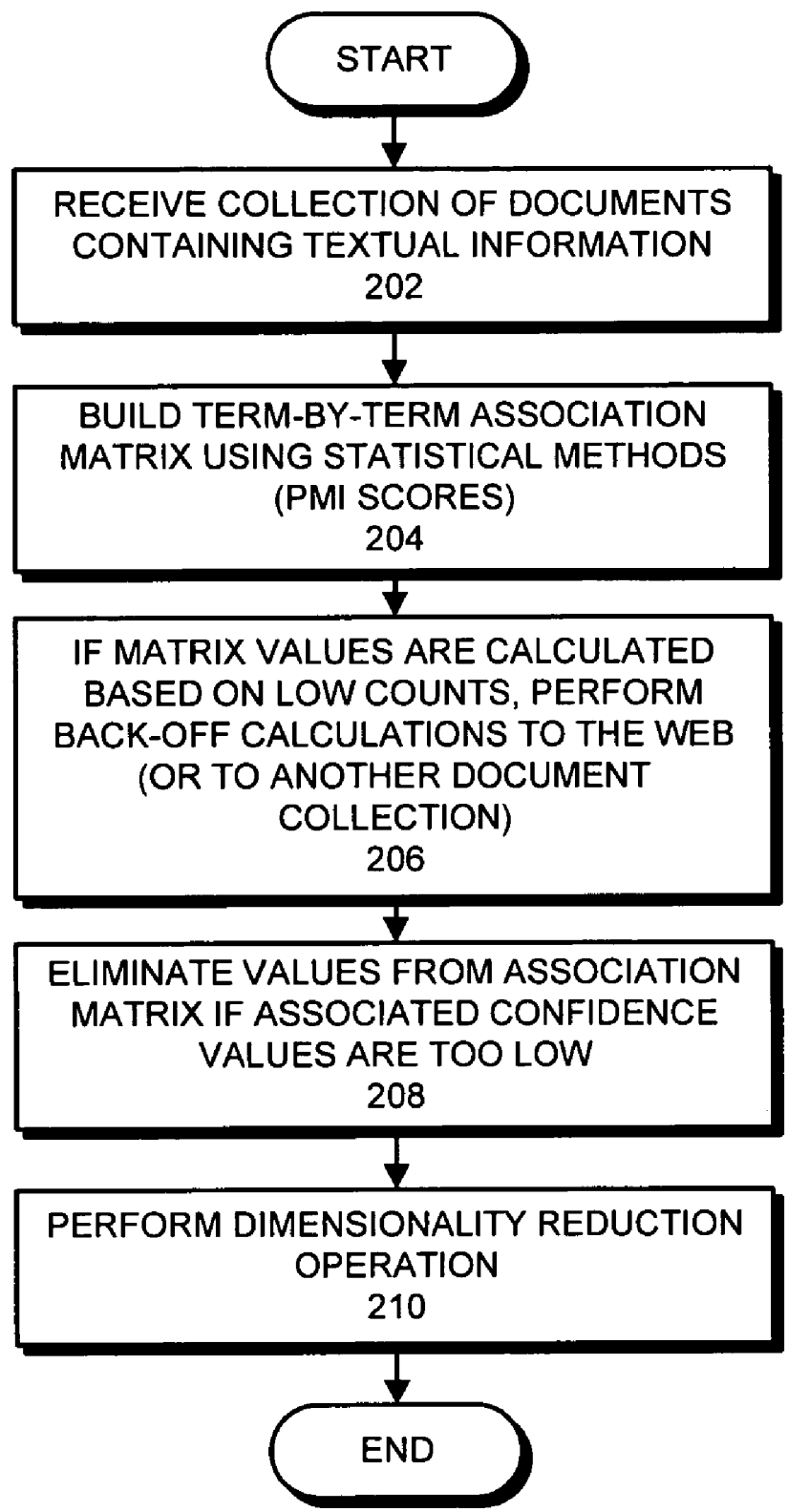
FIG. 2 presents a flow chart illustrating the process of building an association matrix in accordance with an embodiment of the present invention.

FIG. 2 presents a flow chart illustrating the process of building an association matrix in accordance with an embodiment of the present invention. The process starts when the system receives a collection of documents containing textual information (step 202). Next, the system builds a term-by-term association matrix for the collection of documents using statistical methods (for example, by using PMI scores) (step 204). Next, if some of the matrix values were computed using an insufficient number of samples, the system performs "back-off" calculations using the web (or another reference document collection) to determine more accurate values (step 206).

During this process, the system keeps track of statistical "confidence" values for entries in the association matrix. The system can then use these confidence values to "sparsify" the association matrix by eliminating values if their corresponding confidence values are too low (step 208).

Finally, the system can perform a dimensionality reduction operation on the association matrix (step 210). This can involve using any one of a number of known methods, such as the singular-value decomposition (SVD), the isometric mapping (ISOMAP) method, the local linear embedding (LLE) method, or the Laplacian Eigenmaps embedding method. This entire process is described in more detail in following sections of this specification.

Using an Association Matrix

Figure 3:
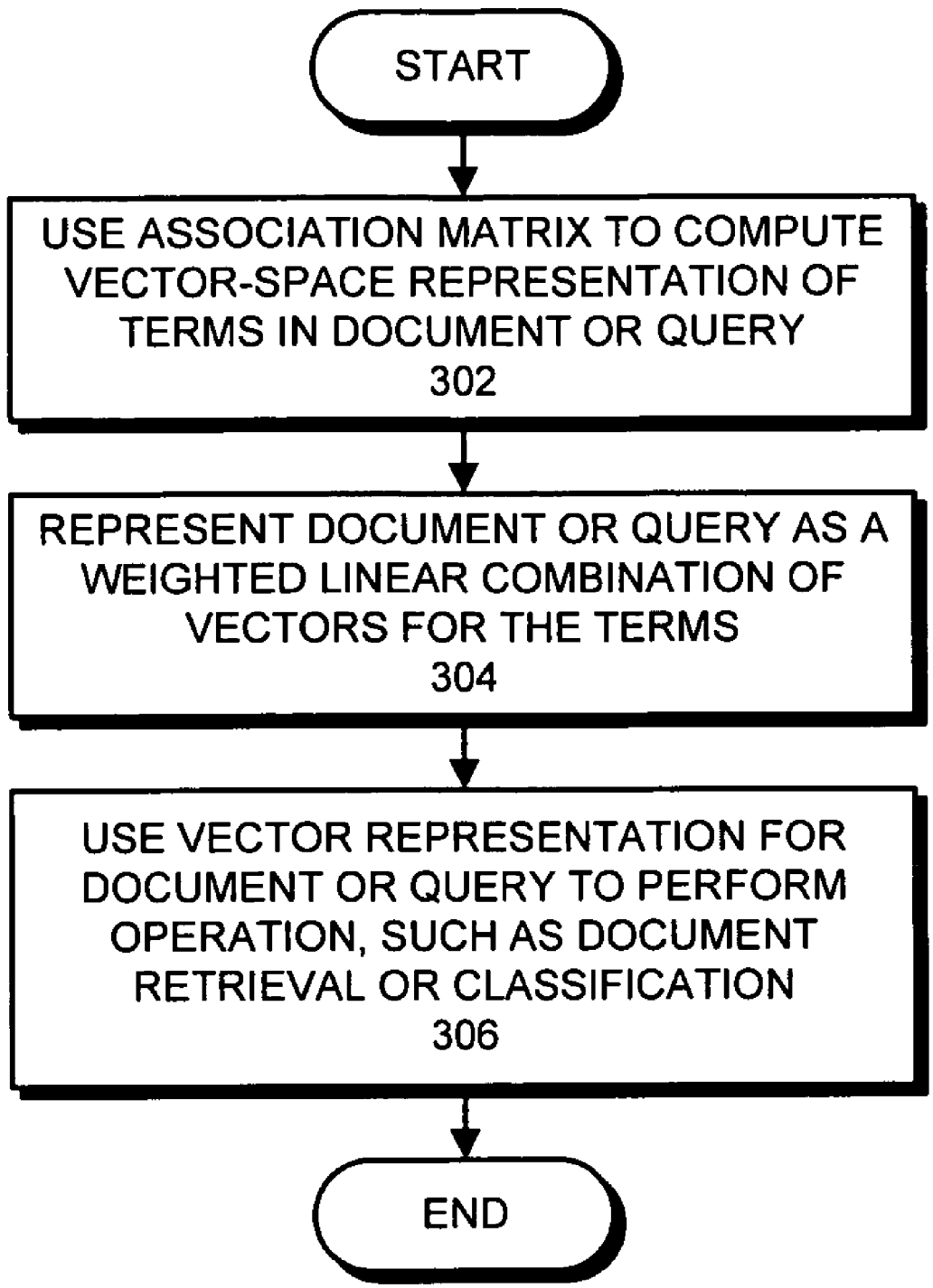
FIG. 3 presents a flow chart illustrating the process of using the association matrix in accordance with an embodiment of the present invention.

FIG. 3 presents a flow chart illustrating the process of using the association matrix in accordance with an embodiment of the present invention. The system starts with a document or query to be characterized. Next, for each term (word) in the document or query, the system uses the association matrix to compute a vector-space representation for terms in the document or query (step 302). Next, the system computes a weighted linear combination of the vectors computed for the terms and uses the resulting vector to represent the document or query (step 304).

Next, the system uses the vector for the document or query to perform comparison operations, for example, to facilitate document retrieval and/or classification (step 306).

This process is described in more detail in following sections of the specification, but we first start with a general description of the approach.

Approach

In one embodiment of the present invention, the general approach uses point-wise mutual information scores (PMI) between the vocabulary terms and the singular-value decomposition (SVD) to compute a lower-dimensional representation of documents and queries. This approach is related to multidimensional scaling (MDS) (see [Cox] T. Cox and M. Cox, "Multidimensional Scaling," $2^{nd}$ Ed., Chapman & Hall/CRC, 2001) It preserves the useful properties of the well-known Latent Semantic Indexing (LSI) technique, such as smoothing of the document term co-occurrence counts statistics and dealing with polysemy and synonymy (see [Dumais] S. T. Dumais, G. W. Furnas, T. K. Landauer, and S. Deerwester, "Using Latent Semantic Analysis to Improve Information Retrieval," Proceedings of CHI '88: *Conference on Human Factors In Computing*, New York: ACM, 281-285).

The classical MDS approach begins with a matrix of pairwise similarities and computes a vector-space representation so that the vector similarities are close to the original similarities. Thus, one can obtain a vector-space representation for the data for which there is no meaningful a priori vector-space representation. The main difficulty in using this approach for documents is that the similarity matrix is generally not available. One embodiment of the present invention deals with this problem by using the PMI score as a measure of similarity between terms. This similarity score has been shown to outperform related approaches (such as LSI) in a number of applications. Note that the present invention can be used in connection with recently developed dimensionality reduction techniques, such as the Locally Linear Embedding technique (see S. T. Roweis and L. K. Saul, "Nonlinear Dimensionality Reduction by Locally Linear Embedding," *Science*, vol. 290, pp. 232-2326, 2000) and the Laplacian Eigenmaps Embedding technique (see [Belkin] M. Belkin, P. Niyogi, "Laplacian Eigenmaps for Dimensionality Reduction and Data Representation," *Neural Computation*, June 2003, 15(6): 1373-1396). These techniques take into account the neighborhood structure of the data and try to recover a lower-dimensional manifold to which the data belongs.

One embodiment of the present invention generates a "term-similarity" matrix using the PMI scores and applies SVD to compute a lower-dimensional representation for the vocabulary terms. The documents are then represented as weighted linear combinations of the terms vectors.

Related Approaches

Latent semantic indexing (LSI) makes the assumption that there is a latent semantic structure in a given document collection, but that this structure is obscured due to synonymy and polysemy. LSI tries to overcome these problems of the simple term-matching strategies by analyzing the co-occurrence patterns of the terms in the document collection. In this way, LSI indexes documents not by individual terms, but by latent semantic concepts represented by them. The latent semantic space is spanned by latent semantic vectors which are computed by performing the singular value decomposition (SVD) of the term-document matrix that represents the document collection. The input to LSI is the term-document matrix and no other information is needed.

Probabilistic latent semantic analysis (PLSA) makes a similar assumption about the existence of a latent semantic structure (see [Hofmann] T. Hofmann, "Probabilistic Latent Semantic Analysis", *Proceedings of the Fifteenth Conference on Uncertainty in Artificial Intelligence*, Morgan Kaufman Publishers, San Francisco, Calif., pp. 289-296, 1999). It estimates the dependencies between the latent semantic classes and term occurrences across documents in form of a probability distribution. However, it uses the "expectation maximization" technique or one of its variants to estimate probability distribution. Therefore, its result depends on the initialization.

Techniques for representing textual data and dimensionality reduction have also been studied in a more general setting. In many cases, including text and images used in information retrieval, the data is assumed to be intrinsically lower-dimensional but the traditional representation puts it in a very high-dimensional space. The available data are considered to be samples from the underlying lower-dimensional manifold which allows recovery of its structure. One hopes to obtain better similarity information by using the distance on the manifold instead of the distance in the ambient space.

The ISOMAP technique computes the n-nearest-neighbors graph of the data and then computes a distance matrix of the data using the distances in the graph that approximate geodesic distances on the manifold better than the Euclidean distance in the ambient space (see J. E. Tenenbaum, V. de Silva and J. C. Langford, "A Global Geometric Framework for Nonlinear Dimensionality Reduction," *Science*, vol. 290, 2319-2323, 2000). Then, it uses MDS to find a vector-space representation that best approximates the distance matrix. The Locally Linear Embedding (LLE) technique represents each point as a weighted combination of its neighbors and finds a lower-dimensional representation in which each point is also very well represented by its neighbors using the same weights. One of the variants of the LLE technique uses a similarity matrix and an adjacency matrix of the data's n-nearest neighbors graph as input.

The Laplacian Eigenmaps embedding technique also finds a representation of the data to reveal the intrinsic geometric structure of the manifold. It is similar to LLE in that it tries to preserve the local similarities. First, a neighborhood graph of the data is constructed. This graph is then used to compute a representation that preserves local similarities between the data points. The local similarities can be inferred from the adjacency matrix of the graph. It has been shown that the Laplacian Eigenmaps embedding technique has close connection to spectral clustering. The eigenvectors of the Laplacian of the graph are used as a new representation of the data.

One embodiment of the present invention differs from the above methods in the following ways. While other methods use dimensionality reduction techniques to compute a lower-dimensional representation of document vectors, the present invention uses SVD to compute a lower-dimensional representation of terms and then creates document vectors as a linear combination of term vectors. We use point-wise mutual information to compute the term similarity matrix and thus need no prior vector-space representation for terms. The PMI scores are computed using the co-occurrence statistics from the document collection and from other resources, such as the Web. Our technique includes an eigenvalue decomposition of the term similarity matrix and can be applied to document collections of any size. We can combine our approach with the LLE and Laplacian Eigenmaps embedding techniques.

In the discussion below, we briefly discuss how a lower-dimensional document representation is computed using LSI and PLSA because we will compare their performance with the performance of our approach on the information retrieval task. We also outline the Laplacian Embedding technique that we used in a combination with our approach.

SVD

It has been shown that given any matrix X and its singular-value decomposition (SVD)

$$X=U\Sigma V^T,$$

the matrix $$X_k=U_k\Sigma_k V_k^T,$$

obtained by setting all but the first k diagonal elements in $\Sigma$ to zero is the rank k matrix that minimizes $$\|X-X_k\|_F^2$$

Wherein $\|\cdot\|_F$ is Frobenius norm, U and V are column orthogonal matrices containing the left and the right singular vectors, respectively, and $\Sigma$ is a diagonal matrix containing the singular values sorted in decreasing order (see G. Golub, C. Reinsch, "Handbook for Matrix Computation II," *Linear Algebra*, Springer Verlag, New York, 1971.).

If X is a symmetric matrix, for example, as a similarity matrix for the data, the left singular vectors in U are the eigenvectors of X and the diagonal elements in $\Sigma$ are the corresponding eigenvalues. In other words, $$X=U\Sigma U^T,$$

If, in addition, X is positive semi-definite, we can assume that there is a vector-space representation of the data such that the inner products between the data vectors correspond to the entries of X: $X=DD^T$. If we require the data vectors to have dimensionality k, we are looking for the best rank k approximation to X in term of the Frobenius norm:

$$\min\|X-DD^T\|_F^2$$

It can be seen from the above description of SVD, that the vector-space representation of the data that best preserves the original similarities in X is given by the first k eigenvectors of X: $D=U_k\Sigma_k^{1/2}$. The metric MDS approach obtains a lower-dimensional representation in a similar way; it includes additional transformations because it uses a distance matrix instead of similarities matrix.

LSI Vector-Space Representation of Documents

LSI uses the term document matrix D to compute a vector-space representation of document in the space of latent semantic concepts. The lower-dimensional representation of documents, $D_k$, and queries, $Q_k$, is obtained by projecting the original document and query vectors on the first k left singular vectors of D:

$$D=U\Sigma V^T$$

$$D_k^T=U_k^T D$$

$$Q_k^T=U_k^T Q$$

It has been observed that LSI computes a lower-dimensional representation of documents that preserves document similarities expressed as inner product between the document term incidence vectors. This can be seen from the right singular vectors of D contained in V. They correspond to the projected documents up to a scaling factor: $\Sigma V^T=U^T D$ and also are the eigenvectors of $D^T D$. The singular values of D, $\sigma_i$, have the following relation to the eigenvalues of $D^T D$, $\lambda_i$: $\sigma_i=\lambda_i^{1/2}$.

As discussed above, $D_k^T=\Sigma_k V_k^T$ is the matrix of rank k that preserves the similarities contained in $D^T D$.

LSI was not the first attempt to use multidimensional scaling techniques and construct a representation of documents in terms of the semantics concepts that they express rather than just as a bag of words, see [Dumais] and citations therein.

Dumais et al. cite an attempt to compute a representation of documents starting with a similarity matrix provided by the humans. However, they decided to use SVD based only on the inner products between the documents in the original space because it gave a similarity matrix based just on the input data.

PLSA Vector-Space Representation of Documents

Probabilistic latent semantic analysis (PLSA) [Hofmann] assumes the following generative model of the co-occurrences between terms and documents: first, a document is selected with probability P(d), then a latent class, z, is selected with probability P(z|d), finally words are selected with probability P(w|z). The probabilities P(z|d), P(w|z) and P(z) are computed using the Expectation Maximization (EM) technique or one of its variants. The document vectors are represented as a probability distribution over the vocabulary terms:

$$P(w|d) = \Sigma_z P(z|d) P(w|z).$$

The resulting probabilities are such that to minimize the KL-divergence between the empirical distribution of term-document co-occurrences and the PLSA distribution:

$$\max L = \sum_d \sum_w n(w, d) P(w, d)$$

$$P(w, d) = P(d) \sum_z P(z|d) P(w|z)$$

where n(w, d) is the number of times word w occurred in document d and P(w,d) is the probability assigned to this event by PLSA. This objective function is equivalent to minimizing the KL-divergence between the empirical distribution and P(w,d) (see [Hofmann] for a more-detailed discussion).

The empirical distribution is based on the number of times a word occurred in a document and no weighting scheme, such as with idf or entropy-based weights, that proved beneficial in many applications. In addition, the use of the EM technique makes PLSA sensitive to the initialization.

Laplacian Eigenmaps Embedding Technique

The Laplacian Eigenmaps Embedding technique has the following setup. We are given n data points as vectors in $R^N$ $x_i, \ldots, X_n$ that belong to a k-dimensional manifold M embedded in $R^N$. The goal is to find a lower-dimensional representation for these points $y_i, \ldots, y_n \in R^k$, where k<N. First, a neighborhood graph of the data is constructed. In the simplest case, it is an n-nearest-neighbors graph G=(V, E). The adjacency matrix W can contain either binary or any real weights associated with the edges. The local similarities can be inferred from the adjacency matrix. The value W[i,j] is non-zero if the corresponding data points are similar. The graph Laplacian L is computed as L=D−W, where D is a diagonal matrix and D[i, i]=$\Sigma_j$W[i,j].

The main contribution of this approach is that it introduces the notion of preserving the similarity only locally. This can be seen from its objective function. The problem is to minimize under certain constraints $$\min \Sigma_{ij} \|y_i - y_j\|^2 W_{ij}$$

There is a penalty if similar points have such a representation that maps them far apart. The eigenvectors of the Laplacian of the graph are used as a new representation of the data (see [Belkin]).

Therefore, a new representation is only defined for the data points seen so far and this representation has to be recomputed to construct a vector-space representation that includes new data points, e.g. a user query. We compute a vector-space representation based on a fixed vocabulary, and thus have this problem of out-of-sample data for unseen terms. However, new terms appear on a much slower rate than new documents. Therefore, our approach will require much less frequent off-line updates of the vector space representation for terms when the vocabulary is extended.

The Locality Preserving Projection (LPP) technique approximates the Laplacian Eigenmaps embedding by computing a linear projection of the data and thus provides a method of folding in new documents (see Xiaofei He, Partha Niyogi, "Locality Preserving Projections," *Proceedings of NIPS* 2003). However, this approach has to have a vector-space representation of documents as input, just like LSI.

PMI-Based Vector-Space Representation of Documents

We take a different approach to computing a vector-space representation of documents. We begin with a similarity matrix for the vocabulary terms. We obtain this matrix by computing the PMI score for each pair of the vocabulary terms.

Point-Wise Mutual Information

If we take a pair of vocabulary terms, $t_1$ and $t_2$, and map them into binary random variables, X and Y, we can compute their point-wise mutual information as the amount of information that occurrence of $t_1$ contains about the occurrence of $t_2$. X equals 1 is $t_1$ appears in a given document and equals 0 otherwise. The PMI similarity is computed as $$PMI(t_1, t_2) = \log \frac{P(X=1, Y=1)}{P(X=1)P(Y=1)} = \log \frac{P(Y|X)}{P(Y)}.$$

The PMI similarity score is equivalent to the term similarity obtained in the spreading activation framework that uses a semantic network to model human memory.

Term Vectors

We use the results discussed in the previous section to compute a vector-space representation for the vocabulary terms. The term similarity matrix S contains the PMI scores for each pair of terms:

$$S[i][j] = PMI(t_i, t_j).$$

We compute the eigenvalue decomposition of S to obtain its right singular vectors:

$$S = U \Sigma U^T$$

and use k eigenvectors corresponding to the first k largest eigenvalues to represent the vocabulary terms. Thus, if S is positive semi-definite, the matrix $$T_k^T = U_k \Sigma_k^{1/2}$$

contains k-dimensional vector-space representations of terms that best preserve the similarities in S with respect to the Frobenius norm. This way, we obtain a vector-space representation of terms without any prior representation, such as document incidence vectors.

Experimental results show that this approach yields good performance. The similarities matrix S based on the PMI scores may not be positive semi-definite. In practice, such matrices are still used within this framework. The approach is to use only the eigenvectors corresponding to the non-negative eigenvalues (compare [Cox])

The lower-dimensional vector-space representation of documents is computed as linear combination of the term vectors. The expansion coefficients can be the weighted term frequencies in the term document matrix:

$$D_k^T = T_k^T D$$

A vector-space representation of queries can be obtained in the same way:

$$Q_k^T = T_k^T Q$$

The LSI representation can be interpreted in a similar way (also see F. Y. Y. Choi, P. Wiemer-Hastings and J. Moore, "Latent Semantic Analysis for Text Segmentation," *Proceedings of the 6$^{th}$ Conference on Empirical Methods in Natural Language Processing*, pp. 109-117, 2001). The left singular vectors U are the eigenvectors of the matrix $DD^T$ that contains pair-wise term similarities computed as inner products between their document incidence vectors. $U_k$ is a vector-space representation for the terms that best preserves these similarities. The lower-dimensional representation of the documents is computed by taking a linear combination of the term vectors:

$$D_k^T = U_k^T D.$$

We will refer to this approach as PMI-based Generalized Latent Semantic Analysis (PMI-GLSA).

We also consider a slightly different similarity measure, namely $$sim(t_1, t_2) = \frac{P(X=1, Y=1)}{P(X=1)P(Y=1)} = \frac{P(X|Y)}{P(Y)}$$

that differs from PMI only in that here we do not take log of the probability ratio. Using it, we can obtain another matrix of term similarities:

$$\hat{S}[i][j] = sim(t_i, t_j).$$

Similarly, we obtain its eigenvectors $\hat{U}$. $\hat{S}$ is positive semi-definite. $\hat{U}_k \hat{\Sigma}_k^{1/2}$ is a vector-space representation for the terms that best preserves these similarities in $\hat{S}$. The vector-space representation for documents and queries is computed as above. We will call this approach probabilities ratio-based GLSA (PR-GLSA).

The advantage is our approach is twofold. First, we begin with a term similarity matrix to compute a vector representation for terms based exclusively on this matrix. PMI has been shown to be a good term similarity measure in a variety of applications. In addition, our approach only requires an eigenvalue decomposition of a term by term matrix. The size of the vocabulary is usually much smaller than the collection size. More importantly, the PMI score can be computed using any other resources apart from the document collection.

Laplacian Embedding Technique

As mentioned above, our term similarity matrix can be used as input to dimensionality reduction techniques other than SVD. We can combine our approach with the Laplacian Embedding technique. The adjacency matrix W can be constructed using the PMI similarities between terms. We compute the eigenvectors of the graph Laplacian to represent the term vectors. Document vectors are obtained by taking their linear combination, as for the PMI-based GLSA case. The difference between using SVD and the Laplacian Embedding technique is that SVD preserves all pair-wise similarities in the similarities matrix S, whereas the Laplacian embedding only preserves local similarities, i.e. similarities between n-nearest points.

CONCLUSION

This disclosure presents a technique for computing a lower-dimensional vector-space representation for documents. In this technique, document vectors are a linear combination of lower-dimensional term vectors. A lower-dimensional vector-space is computed using the point-wise mutual information between terms as a similarity measure. Once we have pair-wise similarity information, we can apply SVD or any other related method, for example the Laplacian Embedding technique, to obtain term vectors.

Previous methods focused on dimensionality reduction techniques that use similarity information between documents. These similarities are obtained using document term vectors and have a number of drawbacks. Linguistically well-founded pair-wise similarity information for terms, however, can be obtained without using term-document vectors. PMI that we described in this specification is just one of the possible measures of term similarity. In addition, semantic relationships between terms are not dependent on a particular document collection, so we can use additional resources such as the Web to refine our PMI computations. The performance improvement that our method has over LSI is based on the fact that our methods finds a vector-space representation for terms that preserves linguistically well founded similarities between them that are computed using a very large number of out-of-collection documents.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for building an association tensor to facilitate document and word-level processing operations, the method comprising:

receiving, at a computer, a collection of reference documents containing textual information;

building, at the computer, the association tensor representing pair-wise similarities corresponding to a co-occurrence of term pairs in the collection of reference documents;

computing a lower-dimensional vector-space representation of terms that preserves the pair-wise similarities in the association tensor based on a singular value decomposition of the association tensor;

deriving a lower-dimensional vector-space representation of a document based on a weighted linear combination of computed term vectors in the lower-dimensional vector-space representation of the terms in the collection of reference documents; and performing semantic analysis upon the collection of reference documents using the lower-dimensional vector-space representation of the document.

2. The method of claim 1, wherein building the association tensor involves computing confidence values for each value in the association tensor; and wherein the method further comprises retaining values in the association tensor if corresponding confidence values are greater than a pre-determined threshold.

3. The method of claim 1, wherein the method further comprises using the lower-dimensional vector-space representation of the terms in the reference documents and a query to perform:
- a clustering operation;
- an information-retrieval operation;
- a text-segmentation operation;
- a text-translation operation;
- a cognitive-modeling operation;
- a synonym-detection operation; or
- a related-term-identification operation.

4. The method of claim 1,
wherein the collection of the reference documents is a World Wide Web (WWW) or a proprietary document collection; and
wherein building the association tensor involves using a search engine to query the collection of the reference documents to determine the pair-wise similarities.

5. A non-transitory computer-readable storage medium storing instructions that when executed by a computer cause the computer to perform a method for building an association tensor to facilitate document and word-level processing operations, the method comprising:
receiving a collection of reference documents containing textual information;
building the association tensor representing pair-wise similarities corresponding to a co-occurrence of term pairs in the collection of reference documents;
computing a lower-dimensional vector-space representation of terms that preserves the pair-wise similarities in the association tensor based on a singular value decomposition of the association tensor;
deriving a lower-dimensional vector-space representation of a document based on a weighted linear combination of computed term vectors in the lower-dimensional vector-space representation of the terms in the collection of reference documents; and
performing semantic analysis upon the collection of reference documents using the lower-dimensional vector-space representation of the document.

6. The non-transitory computer-readable storage medium of claim 5,
wherein building the association tensor involves computing confidence values for each value in the association tensor; and
wherein the method further comprises retaining values in the association tensor if corresponding confidence values are greater than a pre-determined threshold.

7. The non-transitory computer-readable storage device of claim 5, wherein the method further comprises using the lower-dimensional vector-space representation of the terms in the reference documents and a query to perform:
- a clustering operation;
- an information-retrieval operation;
- a text-segmentation operation;
- a text-translation operation;
- a cognitive-modeling operation;
- a synonym-detection operation; or
- a related-term-identification operation.

8. The non-transitory computer-readable storage medium of claim 5,
wherein the collection of the reference documents is a World Wide Web (WWW) or a proprietary document collection; and
wherein building the association tensor involves using a search engine to query the reference document collection to determine the pair-wise similarities.

9. An apparatus, implemented on a computer system, that builds an association tensor to facilitate document and word-level processing operations, comprising:
a processor;
a memory;
a receiving mechanism configured to receive a collection of reference documents containing textual information;
an association-tensor-building mechanism configured to build the association tensor representing pair-wise similarities corresponding to a co-occurrence of term pairs in the collection of reference documents;
a lower-dimensionality-association-tensor computing mechanism configured to compute a lower-dimensional vector-space representation of terms that preserves the pair-wise similarities in the association tensor based on a singular value decomposition of the association tensor;
a lower-dimensionality-matrix-deriving mechanism configured to derive a lower-dimensional vector-space representation of a document based on a weighted linear combination of computed term vectors in the lower-dimensional vector-space representation of the terms in the collection of reference documents; and
a performing mechanism configured to perform semantic analysis upon the collection of reference documents using the lower-dimensional vector-space representation of the document.

10. The apparatus of claim 9,
wherein while building the association tensor, the association-tensor-building mechanism is configured to compute confidence values for each value in the association tensor; and
wherein the association-tensor-building mechanism is further configured to retain values in the association tensor if corresponding confidence values are greater than a pre-determined threshold.

11. The apparatus of claim 9, wherein the apparatus is further configured to use the lower-dimensional vector-space representation of the terms in the reference documents and a query to perform:
- a clustering operation;
- an information-retrieval operation;
- a text-segmentation operation;
- a text-translation operation;
- a cognitive-modeling operation;
- a synonym-detection operation; or
- a related-term-identification operation.

12. The apparatus of claim 9,
wherein the collection of the reference documents is a World Wide Web (WWW) or a proprietary document collection; and
wherein while building the association tensor, the tensor-building mechanism is configured to use a search engine to query the collection of the reference documents to determine the pair-wise similarities.

* * * * *